Figure 1:
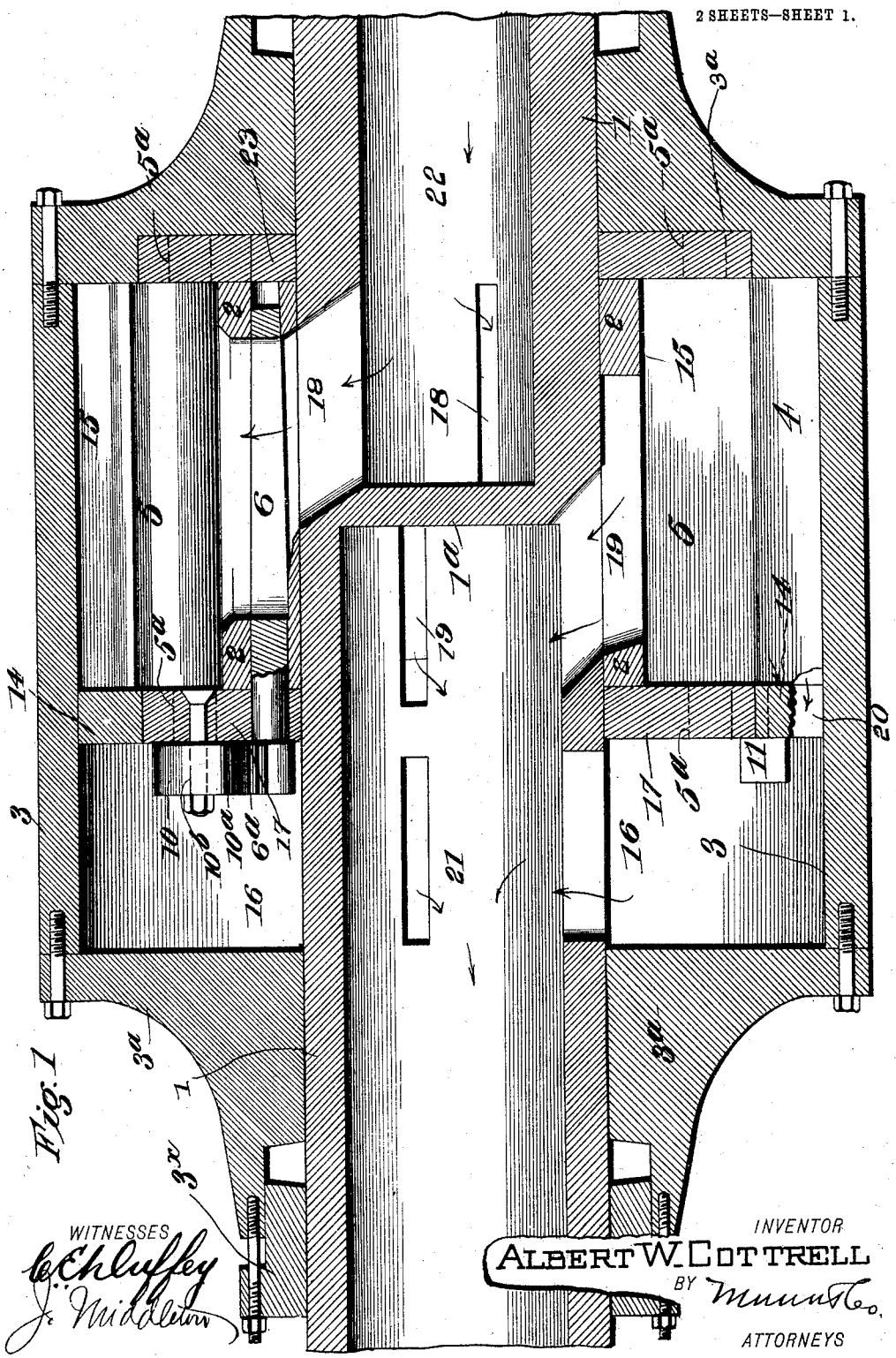

No. 859,744. PATENTED JULY 9, 1907.
A. W. COTTRELL.
ROTARY ENGINE.
APPLICATION FILED APR. 18, 1907.

2 SHEETS—SHEET 1.

WITNESSES
INVENTOR
ALBERT W. COTTRELL
BY
ATTORNEYS

No. 859,744. PATENTED JULY 9, 1907.
A. W. COTTRELL.
ROTARY ENGINE.
APPLICATION FILED APR. 18, 1907.
2 SHEETS—SHEET 2.
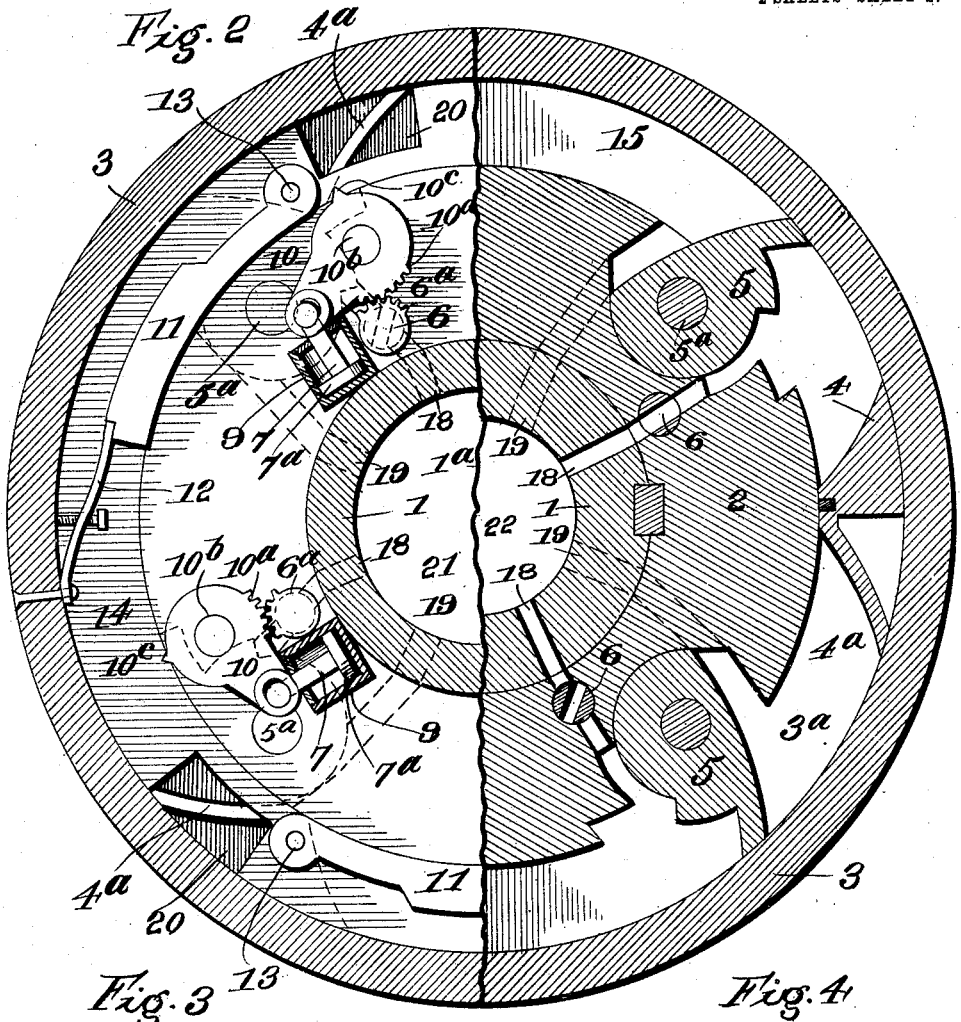
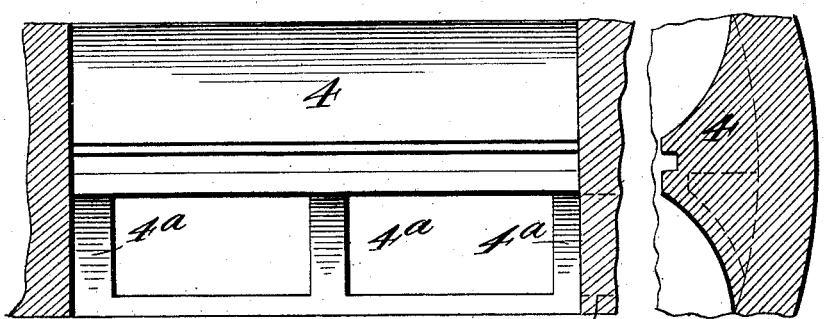
WITNESSES
INVENTOR
ALBERT W. COTTRELL
BY
ATTORNEYS

UNITED STATES PATENT OFFICE.

ALBERT W. COTTRELL, OF DOUGLAS, ARIZONA TERRITORY, ASSIGNOR OF ONE-HALF TO MILTON A. MOORE, OF DOUGLAS, ARIZONA TERRITORY.

ROTARY ENGINE.

No. 859,744.        Specification of Letters Patent.        Patented July 9, 1907.

Application filed April 18, 1907. Serial No. 368,940.

*To all whom it may concern:*

Be it known that I, ALBERT W. COTTRELL, a citizen of the United States, residing at Douglas, in the county of Cochise and Territory of Arizona, have invented a new and useful Improvement in Rotary Engines, of which the following is a specification.

This invention relates to rotary engines of that class in which the cylinder rotates around a stationary shaft or axis, and may be utilized as a pulley for transmitting power, the steam or other driving fluid being introduced through one end of the shaft and exhausted through the other. The cylinder or rotary casing carries pistons which pass swinging abutments set in a hub or central structure which also contains the inlet and exhaust ports controlled by the abutments.

An especial feature of the invention is automatic cut off valves in the inlet ports, which valves are controlled by centrifugal governors. The cut off valves are rotary valves, and give quick and effective action with small movement.

A further feature is a large exhaust space or passage from each steam chamber, tending to the elimination of back pressure.

The invention is illustrated in the accompanying drawing, in which

Figure 1 is a central longitudinal section of the engine. Fig. 2 is a cross section in two half planes, one through the exhaust chamber and the other through the steam chambers. Figs. 3 and 4 are details in face view and end view of one of the pistons or piston heads attached to or forming a part of the rotor.

Referring specifically to the drawings, 1 is a stationary shaft to which is keyed the solid stationary hub or circular block 2. The shaft has an axial steam inlet 22 from one end and axial exhaust 21 through the other end, these passages being separated by a partition 1ª. The rotary cylinder 3 surrounds the shaft and hub and is closed at the ends by rings 3ª to form the steam and exhaust chambers. This cylinder carries an internal flange or ring 14 which bears at its inner edge against a complementary flange or ring 17 which is fixed to the shaft and to the hub 2. The ring 14 forms a partition between the steam chambers 15, and the exhaust chamber 16, and the rings 17 form bearings for flange 14.

The piston heads 4 are fixed to or made integral with the rotor 3 and project to contact with the hub 2. On the forward side they have curved braces or projections 4ª, of proper shape to contact with the backs of the swinging abutments 5 and press them down to allow the piston heads to pass. These abutments 5 are pivoted on end pivots 5ª which are set in bearings in the ring 17 and in a disk ring 23 set in the ends 3ª of the cylinder and secured or keyed to the hub. The abutments swing out or are lifted by the inflowing steam to contact with the inner surface of the cylinder 3, but are swung in by the piston heads as they pass. There are three piston heads, set equal distances apart around the cylinder, and four abutments set equal distances apart around the hub.

The four inlet ports 18 are formed in the hub and extend from the passage 22 and open into the steam chambers 15 directly in front of or under the abutments 5; and the four outlet ports 19 are formed in the hub and shaft, extending from the recesses directly behind the abutments into the exhaust passage 21. The openings from the inlet ports to the steam chamber are located in the recesses in such position that they are covered and closed by the base of the abutments when said abutments are swung down or in, and are uncovered or opened when the abutments are lifted.

Located within the hub 2, and extending across the inlet ports 18, are oscillating cut off valves 6, which also have bearings in and extend through the ring 17. These valves turn to open or close the ports, and effect the cut off. Each valve stem has a segment gear 6ª meshing with a segment gear 10ª on a lever 10 which is pivoted by a pin 10ᵇ to the ring 17 and connected by rod 7 to piston 7ª in a dash pot 9 secured to the ring 17. Normally, the cut off valves are closed by pressure of the exhaust on the pistons 7ª, forcing same to the bottom of the dash pots. The levers 10 also have projecting ridges or lugs 10ᶜ which extend outwardly into position to come in contact with centrifugal governor weights 11 which are pivotally connected at 13 to the side of the ring 14. Springs 12 bear against the governor weights and tend to partially offset their centrifugal action. The governor weights or arms are carried around with the rotor, and when they strike the ridges 10ᶜ they turn the levers 10 and the valves 6 and cause said valves to open, and to remain open as long as the governor weights remain in contact with the ridges. The ring 14 is also provided with four exhaust ports 20 which are located beside the braces or projections 4ª on the forward side of the piston heads, and these exhaust ports open directly into the exhaust chamber 16 and thence into the axial outlet 21.

In operation, the shaft is fixed against rotation, in any suitable way. Steam enters at 22 and passes through the ports 18 and into the steam chambers 15, acting on the piston heads 4 and rotating the cylinder casing 3. When the piston heads contact with the abutments 5 they swing the same in or down and allow the piston heads to pass thereover. At the same time, the inlet ports are closed and the exhaust escapes through the ports 19 and 20. By using three piston heads and four abutments and sets of ports, a dead center is prevented and constant steam action is assured. When the governor weights 11 strike the ridges 10ᶜ on the levers they open the cut off valves 6, as explained, and the valves remain open until the weights run off or beyond the ridges, when they close. But if in consequence of the speed the weights be swung out they will leave the ridges 10° at an earlier moment, thereby allowing the cut off to occur earlier, and so automatically controlling the steam supply. The vacuum in dash pot 9 closes the cut off valve as soon as the weights 11 release the ridges 10°.

At the left in Fig. 1 I show a stuffing box, or hub one of which is also partially shown at the right in said figure. These may be employed when so desired.

I claim.

1. In a rotary engine, the combination of a stationary shaft having inlet and exhaust passages in opposite ends, a hub thereon having inlet and exhaust ports communicating respectively with said passages, swinging abutments mounted in the hub and controlling said inlet ports and a rotary cylinder mounted on the shaft and surrounding said hub and having piston heads arranged to strike said abutments and swing the same inwardly.

2. In a rotary engine, the combination of a rotary casing having steam spaces in one end and exhaust space in the other, said spaces being separated by a partition having exhaust openings therein, piston heads carried by said casing in the steam spaces, the exhaust opening being directly in advance of the piston heads, a fixed shaft and hub within the casing, having inlet and exhaust passages, and abutments carried by the hub and movable in and out across the steam spaces.

3. In a rotary engine, the combination of a fixed hub having inlet and exhaust ports, oscillating cut off valves extending across the inlet ports, a rotary casing surrounding the hub, means to apply fluid pressure between the hub and casing, to drive the latter, governor weights carried by the casing, and means actuated thereby to control the cut off valves.

4. In a rotary engine, the combination with a fixed hub having inlet and exhaust ports and oscillating cut off valves in the inlet ports, levers pivoted in the hub and geared to the valves and connected to the pistons of dash pots, a rotary casing surrounding the hub, and governor weights connected to the casing and arranged to contact with the levers and open the valves, the duration of the contact being in proportion to the speed.

5. In a rotary engine, the combination of a rotary casing having steam spaces in one end and an exhaust space in the other, and a partition therebetween, a fixed drum in the casing having inlet and exhaust ports therein, oscillating valves in the inlet ports and extending through the partition, levers located in the exhaust space and operatively connected to the valves, dash pots mounted on the partition and having pistons connected to the levers, said levers having peripheral projections, pivoted weights connected to the casing and arranged to contact with and wipe over the levers to open the valves, and means to apply fluid pressure between the hub and casing.

ALBERT W. COTTRELL.

Witnesses:
MILTON A. MOORE,
GEO. W. CASS.